Jan. 23, 1940.                    S. R. NICKS                    2,188,252
                JUSTIFYING AND VARIABLE SPACING TYPING MACHINE
                        Filed Aug. 26, 1937          6 Sheets-Sheet 1

INVENTOR.
S. R. NICKS
BY
Edward V. Hardway
ATTORNEY.

Jan. 23, 1940.    S. R. NICKS    2,188,252
JUSTIFYING AND VARIABLE SPACING TYPING MACHINE
Filed Aug. 26, 1937    6 Sheets-Sheet 4

INVENTOR.
S. R. NICKS
BY
Edward V. Hardway,
ATTORNEY.

Jan. 23, 1940.  S. R. NICKS  2,188,252
JUSTIFYING AND VARIABLE SPACING TYPING MACHINE
Filed Aug. 26, 1937   6 Sheets-Sheet 5

INVENTOR.
S. R. NICKS
BY
Edward V. Hardway
ATTORNEY.

Jan. 23, 1940. S. R. NICKS 2,188,252
JUSTIFYING AND VARIABLE SPACING TYPING MACHINE
Filed Aug. 26, 1937 6 Sheets-Sheet 6

INVENTOR.
S. R. NICKS
BY
ATTORNEY.

Patented Jan. 23, 1940

2,188,252

UNITED STATES PATENT OFFICE 2,188,252

JUSTIFYING AND VARIABLE SPACING TYPING MACHINE

Samuel R. Nicks, Houston, Tex.

Application August 26, 1937, Serial No. 161,095

6 Claims. (Cl. 197—84)

This invention relates to a justifying and variable spacing and typing machine.

It is an object of the invention to provide a machine of the character described especially adapted for use in that branch of the printing art commonly referred to as lithography or off-set printing.

Another object of the invention is to provide an improvement in a conventional typewriter, or similar typing machine, wherein regularly formed standard type letters, such as are used in printing, may be substituted for the conventional typewriter type with means for spacing the letters or characters in accordance with their width.

In the ordinary typewriter, or typing machine, the lower case letters are of the same width, that is, each occupies the same amount of space in the line as any other, consequently the platen carriage and platen move a uniform distance, or space, for each letter; the above is also true for upper case, or capital letters, or characters.

It is another object of the present invention to provide a typing machine having standard type, such as is used in printing and wherein the type varies in width, some letters, or characters, being narrower, and occupying less line space, than others and wherein the platen carriage and platen moves a distance corresponding to the line space required in accordance with the width of the letter, or character, last imprinted on the work. In other words, the invention embodies means for variably spacing the letters, or characters, imprinted on the work in accordance with the line space required by such letters, or characters.

Another object of the invention is to provide, in combination with a printing machine, a camera for photographing each printed line upon its completion with means for adjusting the camera toward and from the work to automatically justify the completed lines to the same length and then photographing them on a continuous roll of sensitized film which is automatically moved, one line, depth measure, at a time and the film rewound from the original, or storage reel, on to a receiving reel.

Offset printing, or lithography, is produced, at the present time, from photographic printed plates and the plates themselves are made by transferring the image on the film, or negative, to a zinc plate, hence a negative of the subject to be reproduced is requisite. By the use of methods heretofore employed it is necessary to set the copy up in metal type after the manner of letter press printing, to take a press proof and then produce therefrom a negative on a sensitized film.

By the use of the justifying and variable spacing typing machine hereinafter described, the two processes employed in the methods heretofore used, to-wit, the setting up of letter press type and the proofing of such type are eliminated.

With the above and other objects in view the invention has particular relation to certain novel features of construction, operation and arrangement of parts, an example of which is given in this specification and illustrated in the accompanying drawings, wherein.

Figure 1:
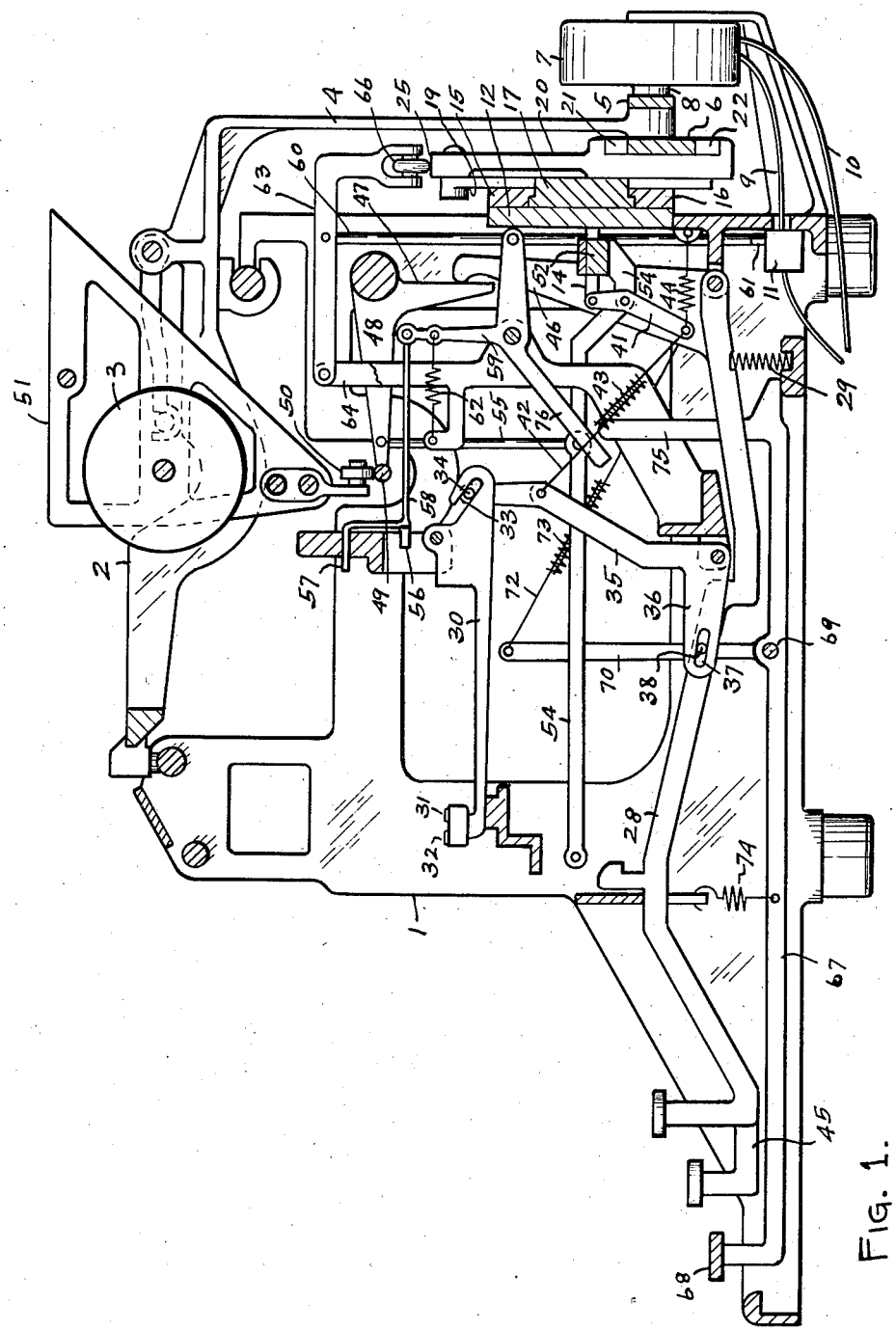
Figure 1 shows a side elevation of a typewriter, or typing machine embodying the invention.

Referring now more particularly to the drawings wherein like numerals of reference designate the same parts in each of the figures, the numeral 1 designates the frame of a typewriter or other typing machine of any conventional construction.

This typing machine has the transversely movable carriage 2 of the usual construction which carries the cylindrical platen 3. The carriage has the depending bracket arms 4, 4 at the rear of the machine to the lower end of which there is fastened the rear and front transverse brake bar 5 and clutch bar 6. An electrical brake is associated with the brake bar 5 and consists of electro-magnet, or solenoid 7 having the core 8 in contact with the brake bar 5. The electro-magnet is electrically connected with a suitable source of electrical energy through the wiring 9, 10 and the electric circuit may be completed or broken by a conventional switch 11 with which one of the conductors is equipped. When the electro-magnet is energized the brake bar 5, as well as the clutch bar 6 will be held against movement. When the switch 11 is opened the electric brake will be released.

Secured to and extended transversely across the rear end of the framework 1 there is a guide plate 12 having the guides 13 therethrough to snugly receive the spacing dogs 14. On the upper and lower margins of the guide plate 12 are the transverse cleats 15, 16, having a dove-tailed connection with, and forming tracks for, the spacing bar 17, as more clearly shown in Figure 1. This spacing bar is movable transversely, its range of movement being limited in one direction by the end stop 18.

Upstanding from the spacing bar 17 there is a bracket 19 and pivotally connected to the upper end of said bracket there is a depending clutch lever 20. The lower end of this clutch lever has the spaced upper and lower clutch jaws 21, 22 which are spaced apart a sufficient distance to receive the clutch bar 6 snugly between them. The bracket 19 is countersunk into the rear side of spacing bar 17, and extends beneath it, as shown in Figure 7 and the pull spring 23 is attached, at one end, to the lower end of the lever 20 and at its other end to the bracket 19 and normally this spring holds the clutch lever 20 in angular relation to the bar 6 so as to cause said jaws 21, 22 to grip the upper and lower margins of the bar 6 so as to hold said bar against movement.

The upper end of the lever 20 has an overturned release arm 24, presenting a flat upper bearing face 25. Upon downward movement of the arm 24 the clutch lever 20 will be moved so as to cause the gripping surface of the jaws 21, 22 to move into parallel relation with the margins of the bar 6 whereby said bar will be released from the gripping action of the jaws 21, 22 and permitted to move. Upon release of the jaws the pull spring 26, attached at one end to the bracket 19, and at its other end to the frame 1 will cause a movement of the space bar 17, the range of said movement being limited by one of the dogs 14 as hereinafter explained.

Figure 7:
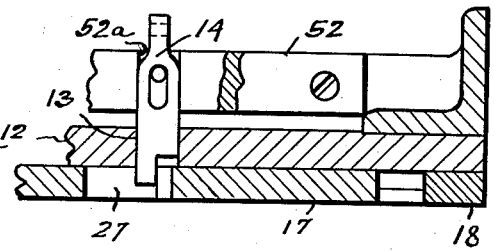
Figure 7 shows a horizontal, sectional view showing the spacing dog in active position.
Figure 8:
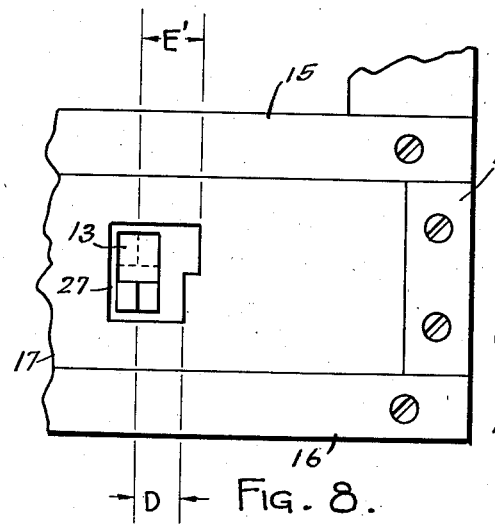
Figure 8 shows a fragmentary, rear elevation showing the construction illustrated in Figure 6.
Figure 9:
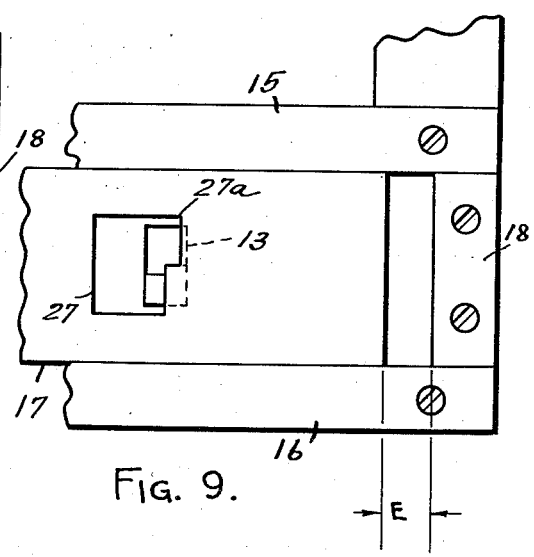
Figure 9 shows a fragmentary rear elevation illustrating the construction shown in Figure 7.
Figure 10:
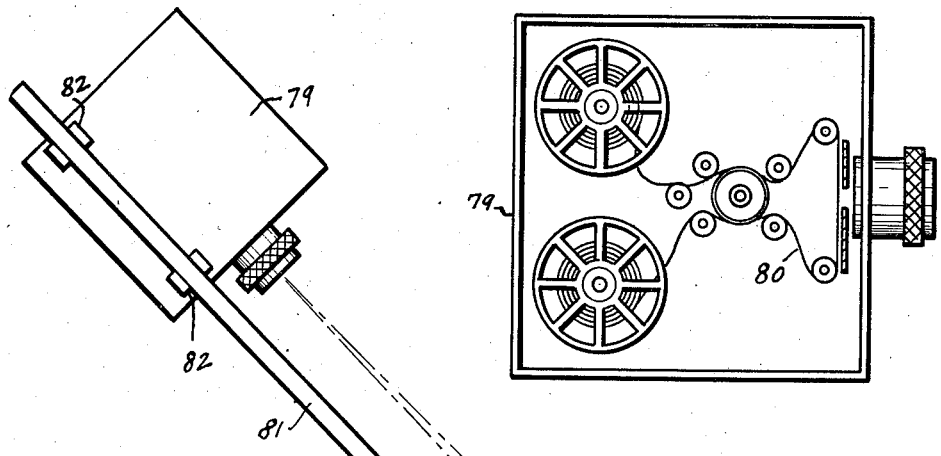
Figure 10 shows a side view of a camera employed.
Figure 11:
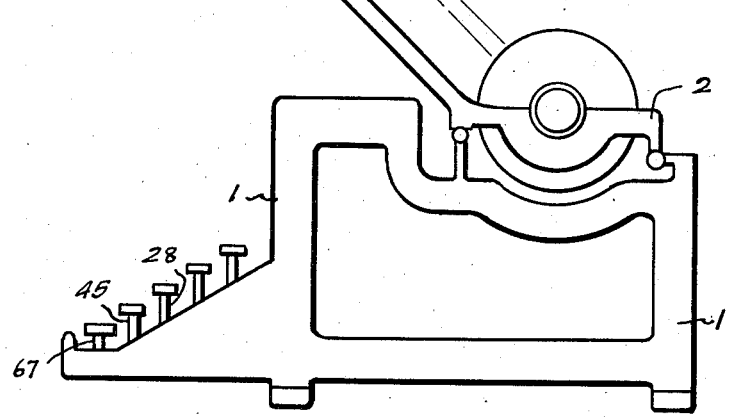
Figure 11 shows a side view of the camera mounted on the typing machine.

The space bar 17 has a series of openings, as 27 therethrough, into which the spacing dogs 14 may be projected, as hereinafter explained, and as shown in Figure 7 and Figure 9. It may be here noted that there is a spacing dog, and a corresponding spacing opening, in the bar 17 for each type key lever and one for the spacing lever.

The numeral 28 designates a conventional key lever which is pivoted, at its inner end to the frame and which is normally held elevated by the compression spring 29. Corresponding to each key lever there is the conventional type bar 30 pivoted to the main frame and whose forward, or free, end is provided with lower and upper case type 31, 32. The other end of the type bar has the diagonal slot 33 forming a bearing for the pin 34 which extends out laterally into said slot from the upper end of the type bar link 35 which is pivoted at its lower end to the main frame and has the forwardly extended arm 36 which is provided with an oblong slot 37 to receive the stud 38 which extends out laterally from the corresponding key lever 28. Upon depression of the key lever the upper end of the type bar link 35 will be thrown forwardly and the free end of the type bar 30 will be actuated upwardly to carry the type into printing relation with the platen 3 in the conventional manner.

The inner end of each spacing dog 14 is pivotally connected to the upper end of an actuating lever 41 and the lower end of this lever is connected to the type bar link 35 by means of the tie 42 which includes a compression spring 43. Accordingly upon actuation of the type bar link 35, the corresponding dog 14 will be projected through its aligned opening 27. Upon release of the key lever 28 the spring 29 will elevate it to its original position thus releasing the tension on the compression spring 43. Thereupon the pull spring 44 will operate through the lever 41 to retract the corresponding dog 14. This pull spring 44 is attached, at one end, to the main frame 1 and at its other end to the free end of the lever 41.

The dogs 14 operate through the vertically elongated openings, or guides, in the guide plate 12, as hereinabove explained, whereby the dogs 14 may be shifted vertically in said guides, for a purpose to be hereinafter explained, as the shift lever 45 is manipulated to shift from lower case to upper case letters. This shifting is accomplished in the conventional manner. The inner end of the shift lever is pivoted on the main frame in the same manner as the key lever 28. The pivoted end of the shift lever 45 has an upstanding finger 46 whose upper end is forwardly curved and rides against the bearing face 47 of the depending arm of the bell crank 48. There are two of these bell cranks, one at each side of the machine and the free ends of their horizontally extended arms support a transverse rod 49 which forms a track on which the roller 50 runs in the conventional manner. The conventional platen support is designated generally by the numeral 51 and the roller 50 is carried by this platen support. Upon actuation of the shift lever 45, the finger 46 will be actuated forwardly and the track 49, the platen support, and the platen will be elevated. When the platen is in lower position the lower case letters 31 cooperate therewith and when elevated the upper case letters 32 cooperate therewith in the well known manner.

The dogs 14 are mounted in a magazine 52. This magazine has the forwardly directed brackets 53 on which the respective levers 41 are pivoted and the ends of the magazine 52 are supported on the lift levers 54, one at each side of the machine. The forward ends of the lift levers are pivoted to the framework 1 and these levers are connected to the horizontal arms of the bell cranks 48 by the lift lever rods 55. Accordingly, upon the actuation of the shift lever 45 the lifting levers 54 and magazine 52, with the series of dogs 14 therein, will be elevated to upper position. The dogs 14 work through bearings 52a of the magazine.

Upon actuation of a key lever 28 the corresponding type bar 30 will be operated as explained and upon operation of any type bar it will strike the transverse thrust bar 56. This thrust bar is supported by an upstanding guide 57 whose upper end is forwardly turned and extended through a bearing in the framework of the machine. Extending rearwardly from the thrust bar 56 is a thrust rod 58 whose rear end is pivoted to the free end of the upstanding arm of the bell crank 59. The other arm of said bell crank has a pivotal connection with a vertically movable switch-actuating rod 60. The lower end of this rod 60 is aligned above the push rod 61 of the switch 11. When a type bar is actuated as above stated there will be a rearward thrust imparted to the rod 58 and a downward thrust to the rod 60 closing the switch 11. Upon release of the key lever the bell crank 59 will be moved to original position by the pull spring 62, one end of which is attached to the upstanding arm of said bell crank and the other end of which is attached to a stationary part of the framework. Upon closing of the switch 11 the electric brake hereinabove referred to will be rendered active to hold the brake and clutch bars 5, 6 and the carriage of the machine stationary.

There is a clutch release lever 63, one end of which is pivoted to a transverse yoke 65 which is supported on the upstanding standards 64, 64. The rear end of this release arm is downwardly turned and mounted thereon is a roller 66 which rides against the bearing face 25 of the laterally extended arm 24. The upper end of the rod 60 is connected to the release arm 63 and upon downward actuation of the rod 60, as hereinabove explained, the roller 66 will actuate the clutch lever 20 to release the clutch shoes 21, 22 thus permitting the spacing bar 17 to move, under the influence of the spring 26, to the left as indicated in Figures 7 and 9 and upon release of the key lever and the subsequent upward movement of the rod 60, under the influence of the spring 62, the roller 64 will be released from the face 25 and the spring 23 will thereupon operate to again apply the mechanical clutch to the bar 6.

The numeral 67 designates a space bar lever. In the conventional type of typing machine there are two of these levers, one on each side and connected, at their forward ends, by the space bar 68. At an intermediate point each space bar lever is pivoted on the transverse rod 69 and upstanding from one of said levers 67, at its pivotal mounting there is the arm 70. The free end of this arm is connected to the free end of the corresponding actuating lever 41 by means of a tie 72 which includes a compression spring 73 so that upon actuation of the space bar 68 the dog 14 corresponding to said bar will be projecting through its aligned opening 27. The forward ends of the space bar levers 67 are normally held elevated by the coil spring 74 which is connected at one end to one of said levers and at its other end to the framework above. The inner end of one of the space bar levers 67 carries an upstanding finger 75 aligned underneath the free end of the forwardly projecting arm 76 of the bell crank 59. When the space bar 68 is depressed the finger 69 will elevate the arm 76 moving the rod 60 downwardly, closing the switch 11, as before and setting the electric brake to hold the brake bar 5 and clutch bar 6 against movement and releasing the mechanical clutch to permit retraction of the spacing bar 17, under the influence of the spring 26 as hereinabove explained thus controlling the spacing between the typed words or characters. Upon release of the space bar 68 it will be elevated by the spring 74 thus releasing the corresponding dog actuating lever 41 and permitting the corresponding spacing dog 14 to be retracted by the corresponding pull spring 44.

Figure 2:
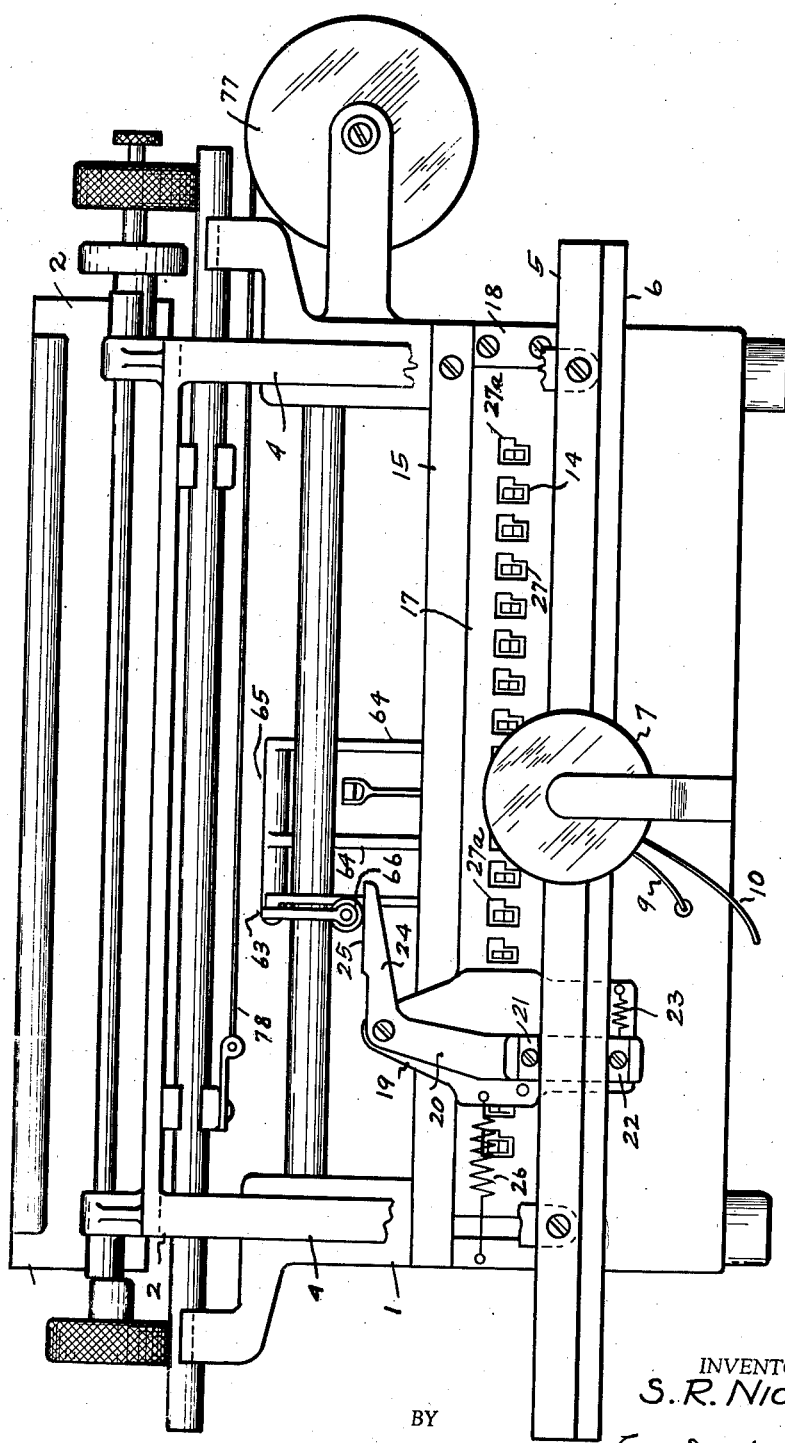
Figure 2 shows a rear elevation.
Figure 3:
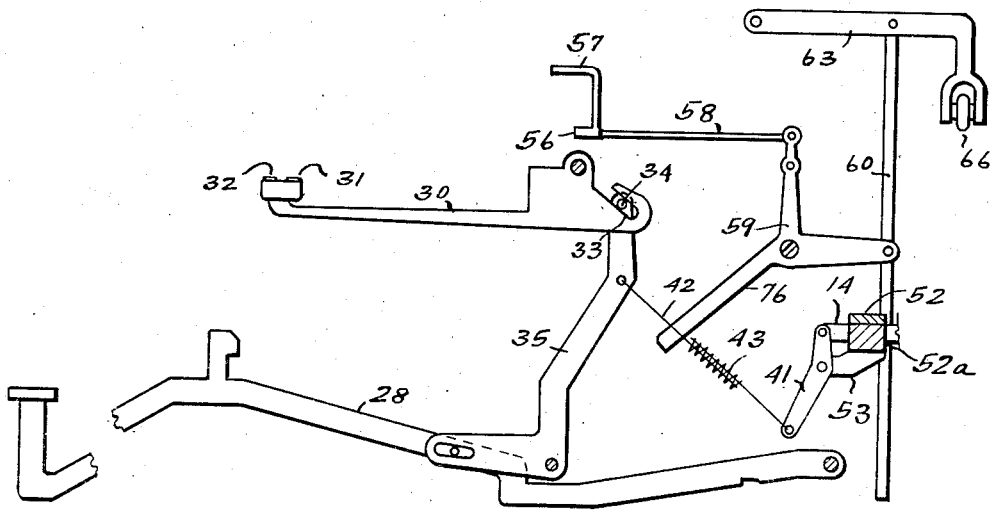
Figure 3 shows a fragmentary side elevation showing the key lever and associated parts.
Figure 4:
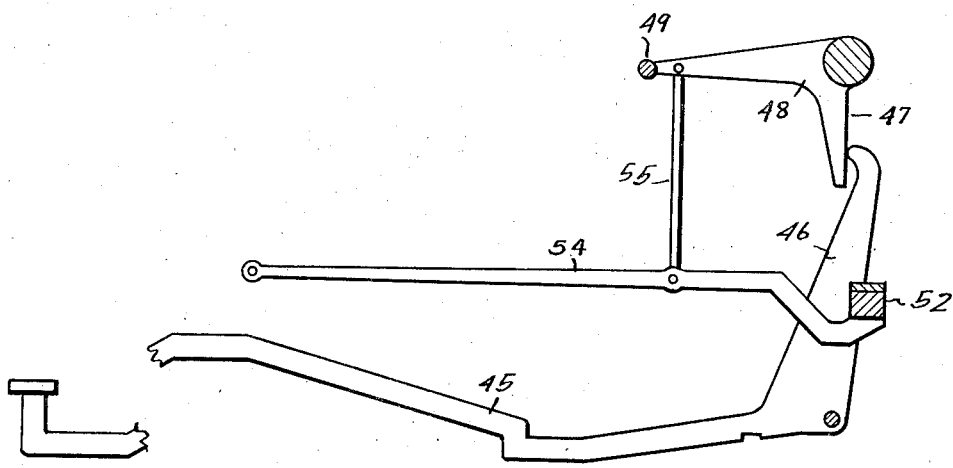
Figure 4 shows a fragmentary side elevation showing the shift lever and associate parts.

The carriage 2 is moved by the conventional means for that purpose. As shown in Figure 2 there is an involute spring housed within the housing 77 with its free end 78 attached to the carriage.

As also clearly illustrated in Figure 2, the openings 27 vary in width and likewise the corresponding dogs 14, which work through said openings also vary in width. The upper ends of said openings as 27a are widened laterally as also shown in Figure 2 and for a purpose to be hereinafter stated.

The faces of various letters and characters used in printing, and of the regular printing type, vary in width over a wide range from the narrowest of lower case letters to the widest of upper case letters. However, in the ordinary typing machine the spacing for the letters and characters used is the same. In order to adapt a typing machine, however, for use in lithography or offset printing, it is necessary to provide for variable spacing, rather than the uniform spacing so that spacing for each letter, or character, will vary in accordance with the width thereof; and this should be done automatically. By the use of the present invention this automatic variable spacing may be accomplished—that is, the carriage is automatically released and permitted to move only the required space for each individual letter, or character, as it is printed on the work. The movement of the carriage, that is, the spacing, takes place immediately after the letter, or character, is imprinted on the work and the spacing mechanism is such that the carriage is permitted to move the exact space or width of the letter, or character, immediately after such letter, or character, is imprinted on the work. In order to more clearly disclose this feature the operation of the device will be briefly stated as follows:

Upon depression of a key lever as 28 the dog 14, corresponding to said lever will be projected rearwardly through its opening 27, the key bar 30 will be actuated to cause a lower case letter 31 to come into contact with the work and print the letter or character thereon. At the same time the switch 11 will be closed and the electric brake rendered operative to hold the brake bar 5, the clutch bar 6 and the carriage against movement. The clutch lever 20 will also be operated to release the clutch jaws 21, 22 from the clutch bar 6 thus releasing the spacing bar 17 to the pull of the spring 26. The bar 17 will then move a distance depending on the relative width of the opening and the dog which has been projected through said opening. The relative width of said dog and opening should correspond to the width of the letter, or character, just impressed or printed on the work. The distance of this movement is indicated by the letter E (see Figure 9). Upon release of the key lever the switch 11 will be opened releasing the electric brake and the roller 66 will be released from the arm 24 to permit the spring 23 to engage the clutch shoes 21, 22 with the clutch bar 6. The carriage, clutch bar 6 and spacing bar 17 are now clutched together and can move only the distance indicated by E, Figure 9, whereupon the spacing bar 17 will engage the stop 18. It will be seen that the carriage has moved only the distance required for the width of the letter, or character, just imprinted on the work. Each dog 14 and its corresponding opening 17 are of such relative width as to allow the carriage to move only a distance corresponding to the width of the letter or character, last imprinted on the work.

When upper case or capital letters are to be used the shift lever 45 may be depressed thus elevating the carriage, as hereinabove explained and at the same time correspondingly elevating the magazine 52 so as to carry the dogs 14 into alignment with the widened portions 27a of the openings 27. Thereupon upon the operation of a key lever the corresponding key bar 30 will be actuated as hereinabove explained bringing the uppercase letter, or character, 32 into printing relation with the work. The corresponding dog 14 will be projected through its opening 27 but opposite the widened portion 27a thereof so as to allow a greater range of movement of the spacing bar 17. The widened portions 27a vary in width in accordance with the variations in width of the corresponding upper case letters. Otherwise the operation of the machine is the same as it is in the case of the lower case letters as before explained.

Figure 5:
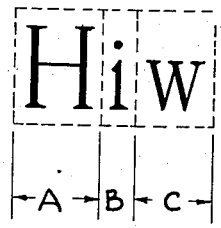
Figure 5 shows a diagrammatic view illustrating a sample of the work.
Figure 6:
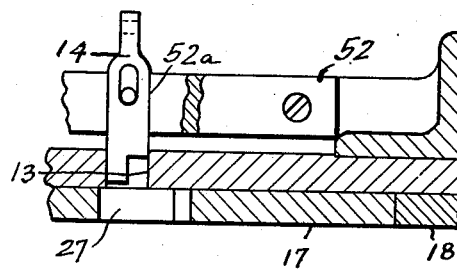
Figure 6 shows a fragmentary, horizontal, sectional view showing the spacing dog in inactive position.

Variations in the widths, and the corresponding spacing, of the printed letters, or characters, are illustrated in the diagram shown in Figure 5.

Figures 12, 13:
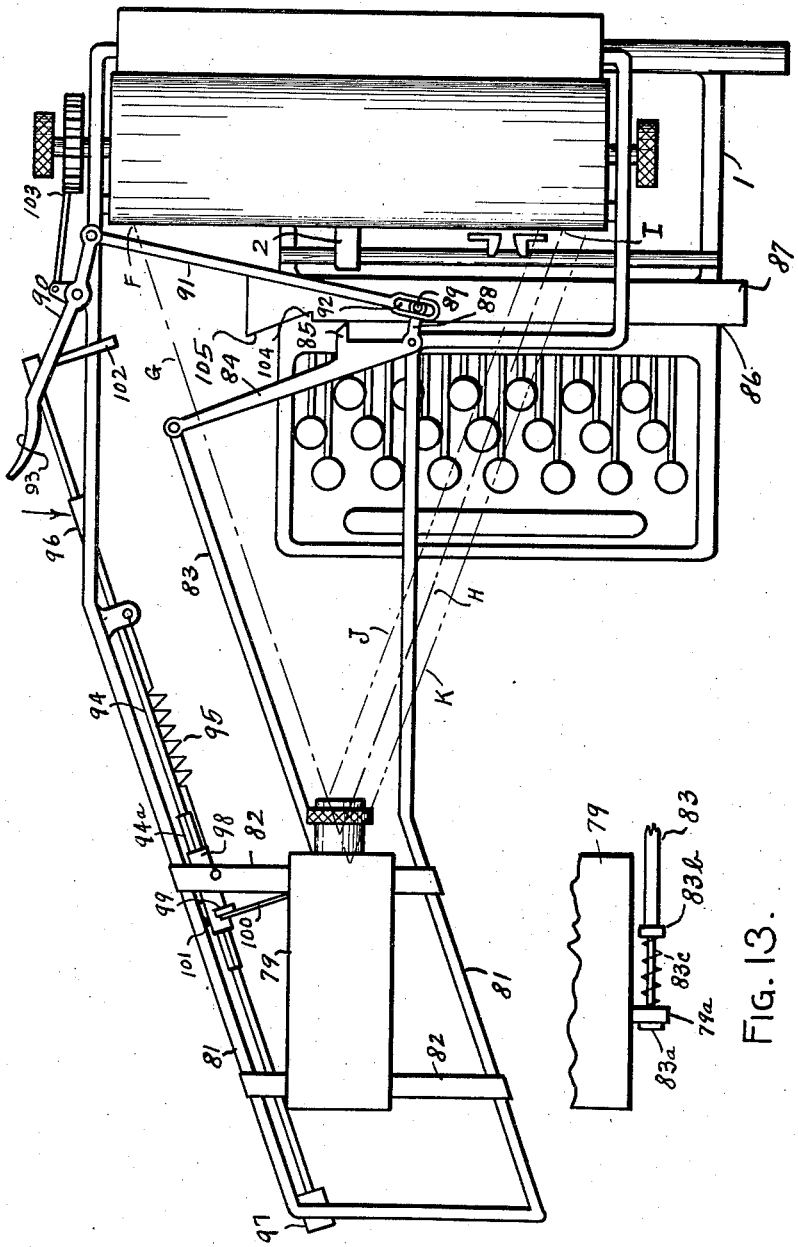
Figure 12 shows a plan view thereof.
Figure 13 shows a fragmentary side view thereof.

Referring to Figures 10, 11, 12 and 13 means are there disclosed for justifying the printed lines from an approximate length, or measure to an accurate length, which justifying means will now be described:

The numeral 79 designates a conventional type of camera wherein there is mounted, for movement, a sensitized film 80. The film is moved by any conventional mechanism suitable for the purpose and is exposed by a conventional shutter mechanism of any selected type. Fastened to the carriage 2 of the typing machine and movable therewith, and arranged at a suitable inclination with respect thereto there are the tracks 81, 81. Slidably mounted on these tracks are the camera supporting bars 82, 82 which support the camera as shown. The camera is held in normal position by the actuating bar 83 and the actuating lever 84. This bar and lever are pivotally connected together at their outer ends as shown in Figure 12 and the lever is pivoted at its other end on one of the tracks 81 and is provided with a guide finger 85 which normally rides against the forward straight edge 86 of the justifying bar 87. The bar 87 is fastened to the framework 1 with its forward straight edge 86 aligned with the tracks along which the carriage 2 moves. The pivotally mounted end of the lever 84 has a rearwardly directed arm 88 on which a bearing pin 89 is mounted. Pivotally mounted on the other track 81 there is a shift lever 90 and one end of the cross-link 91 is pivotally connected to one end of this lever 90. The other end of the cross-link has an oblong bearing 92 in which the pin 89 works. The other end of the lever 90 is extended and formed with a grip 93. The outer end of the actuating bar 83 is reduced and works through a bearing through the bearing member 79a on the bottom of the camera and is provided with an enlarged head 83a which is engageable with the bearing member 79a. The actuating bar has a stop 83b and surrounding the reduced end of said bar and interposed between said stop and the bearing member 79a is a coiled spring 83c.

There is a brake rod 94 mounted in suitable bearings 96, 97 and arranged parallel with one of the tracks 81. A section 94a of this brake rod is formed square and slidably mounted thereon is a sleeve 98. Upstanding from this sleeve 98 there is an arm 99 and connected at one end to the upper end of this arm and at its other end to the conventional shutter operating mechanism of the camera there is the operating link 100.

On the sleeve 98 there is a brake shoe 101. On the inner end of the brake rod 94 there is an upwardly inclined arm 102 arranged underneath the shift lever 90.

When the end of a line has been reached and it is desired to return the carriage to position to begin another line the lever 90 may be actuated in a direction indicated by the arrow in Figure 12. This will operate, through the conventional rack-and-dog arrangement 103, to impart a partial rotation to the platen of the typing machine in the usual way to bring the completed line of printing in alignment with the camera and the lever 90 will thereafter contact with the arm 102 and depress the same partly turning the brake rod 94 and carrying the shoe 101 into frictional engagement with the adjacent track 81 and at the same time acting through the link 100 to operate the shutter of the camera. The link connection between the sleeve 78 and the camera is of sufficient rigidity that the camera will thereby be held stationary during this operation but the film of the camera will be exposed and a photograph of the printed line last completed will be imaged on the film. Continued pressure on the lever 90 will return the platen carriage and platen, with the work thereon, to starting position.

Upon release of the lever 90 the finger 85 will contact against and move along the forward straight edge 86 of the justifying bar 87 as the next succeeding line is typed.

Each printed line will begin at a definite uniform margin indicated by the letter F of Figure 12, which point is common with the corresponding, or left line G, defining the field of the visual angle of the camera. This margin of the field is constant and the tracks 81, 81 are arranged at such angles to the line of travel of the carriage as to maintain the left margin of the field constant with relation to the work as the camera moves forwardly or backwardly as hereinafter stated. The right margin of the field, when the camera is in its normal position, is indicated by the line H, Figure 12 and is common with the margin at which the printed lines end at I. Upon printing, should the line terminate within the field determined by the lines G and J it will not be justified but will be photographed from the normal camera position, but any line terminating between the points determined by the lines J and K will be justified to give a photographed line of normal length, that is, a length equal to, or approximately equal to, the length of a line which extends between the two margin points F and I. When the printed line extends past the point determined by the line J the finger 85 drops into the notch 104 at the end of the straight edge 86 and thereupon the pull spring 95 will move the camera forwardly, or bring it closer to the work, thus lengthening the short line, imaged on the film, to regulation length. As the length of the printed line increases to the point I the finger 85 will ride along the forwardly inclined guide 105 thus moving the camera backwardly or away from the work, with the result that the amount of justification decreases until the camera reaches its normal position. Thereafter, as the length of the printed line increases past point I the camera moves farther away from the work thus shortening the line, imaged on the film, to, or approximately to, the desired length of line. At the termination of the movement of the lever 90 to actuate the shutters of the camera, the outer end of the slot 92 will engage the pin 89 thus actuating the lever 84 and releasing the finger 85 so that it will not engage in the notch 104 upon return movement of the platen carriage and platen to starting position. During this final movement of the lever 90, to actuate the lever 84, the camera 97 being held against movement by the brake 101 the spring 83c will be placed under compression thus allowing a certain independent movement of the bar 83 relative to the camera. However, with the lever 90 in its rormal position and the brake 101 released the camera 79 will move in harmony with the movement of the lever 84 as the finger 85 moves along the inclined track 105, the spring 83c having sufficient strength for that purpose.

When the carriage is returned to starting position, as hereinabove explained, the coil spring 95, connected at one end to the front supporting bar 82 and at its other end to one of the tracks 81, will return the camera to original or normal position.

The drawings and description disclose what is now considered to be a preferred form of the invention by way of illustration only, while the broad principle of the invention will be defined by the appended claims.

What I claim is:

1. A typing machine comprising a frame and a carriage, a plurality of printing type, means for selectively actuating the type into printing relation with the work, a movable dog connected to and actuated by each of the type actuating means, a movable spacing bar, means for moving said bar, a clutch for engagement of the bar to the carriage, an electrically operable holder associated with the carriage, each of said dogs, when actuated by the type-actuating means being arranged to engage with and allow limited movement of the spacing bar and means to operate the holder before and the clutch after movement of the spacing bar.

2. A typing machine comprising a frame, a transversely movable work holding carriage on the frame, a plurality of type, means for selectively actuating the type into printing relation with the work on the carriage, a movable spacing bar having openings, one for each type, holding means arranged to be set, to hold the carriage stationary, upon actuation of a type, a dog corresponding to each type and operatively connected with each type actuating means and arranged to be projected into its corresponding opening upon actuation of a type, clutch means on the spacing bar for clutching the bar with the carriage, means for releasing the clutch means, upon actuation of a type, to permit the bar to move to one position, means for causing such movement of said bar, means for releasing the holding means and means for causing engagement of the clutch means with the spacing bar upon release of the actuated type-actuating means to cause said bar to return, with the carriage, to original position and stop means, with which said bar engages when it reaches said original position.

3. A typing machine comprising a frame, a transversely movable work holding carriage on the frame, a plurality of type, means for selectively actuating the type into printing relation with the work on the carriage, a movable spacing bar having openings, one for each type, holding means arranged to be set, to hold the carriage stationary, upon actuation of a type, a dog corresponding to each type and operatively connected with each type actuating means and arranged to be projected into its corresponding opening upon actuation of a type, clutch means on the spacing bar for clutching the bar with the carriage, means for releasing the clutch means, upon actuation of a type, to permit the bar to move to one position, means for causing such movement of said bar, means for releasing the holding means and means for causing engagement of the clutch means with the spacing bar upon release of the actuated type-actuating means to cause said bar to return, with the carriage, to original position and stop means with which said bar engages when it reaches said original position.

4. A typing machine comprising a frame, a movable, working holding carriage on the frame, a plurality of type, means for selectively actuating the type into printing relation with the work on the carriage, holding means arranged to be set to hold the carriage stationary upon actuation of a type, and to be released upon release of said actuating means, a movable spacing bar, clutch means normally clutching the spacing bar with the carriage, means for releasing the clutch means to release the bar from the carriage upon the actuation of a type, a plurality of dogs connected with the type actuating means, each dog being arranged to be projected to active position, upon actuation of its corresponding type actuating means and to be retracted upon release of such actuating means, stops on said bar, means for moving the bar upon release of the clutch means, the projected dog and its corresponding stop on said bar being spaced variable distances apart to permit the released bar to move a distance corresponding to the line width of the type last imprinted on the work, means for causing a movement of the carriage upon release of an actuated type and means for causing a re-engagement of the clutch means to cause movement of the bar with the carriage upon release of the actuated type stop means to limit such movement of the bar and carriage.

5. A typing machine comprising a frame, a work holding carriage movable on the frame, a plurality of type, means for selectively actuating the type into printing relation with the work on the carraige, means for moving the carriage, means for releasing the carriage to said moving means upon actuation of a type, means including a movable spacing bar, and means for moving said bar, and dogs controlled by the type actuating means, said dogs being movable to active position in interlocking relation with the bar, upon actuation of the corresponding type, to limit the range of such carriage movement, an electrically operable holder controlled by the type actuating means for temporarily holding the carriage against movement and clutch means for clutching the carriage with the spacing bar upon movement of the carriage.

6. A typing machine comprising a frame, a work holding carriage movable on the frame, a plurality of printing type, means for selectively actuating the type into printing relation with the work on the carriage, means for moving the carriage, means for releasing the carriage to said moving means upon actuation of a type, a movable spacing bar, means for moving said bar, clutch means on the bar, means controlled by the type actuating means and movable to active position, upon actuation of a type, to engage the spacing bar and limit the range of such carriage movement, an electrically operable holder controlled by the type actuating means and effective to temporarily hold the carriage stationary while the range-limiting means are moving to active position and means to thereafter engage the clutch to effect the subsequent, simultaneous movement of the carriage and spacing bar.

SAMUEL R. NICKS.